(12) United States Patent
Takaba

(10) Patent No.: US 8,305,399 B2
(45) Date of Patent: Nov. 6, 2012

(54) DISPLAY DEVICE, CONTRAST ADJUSTING METHOD AND CONTRAST ADJUSTING PROGRAM

(75) Inventor: Nobumichi Takaba, Hokkai-do (JP)

(73) Assignee: Panasonic Corporation, Osaka (JP)

( * ) Notice: Subject to any disclaimer, the term of this patent is extended or adjusted under 35 U.S.C. 154(b) by 1208 days.

(21) Appl. No.: 11/886,037

(22) PCT Filed: Feb. 23, 2006

(86) PCT No.: PCT/JP2006/303323
§ 371 (c)(1),
(2), (4) Date: Sep. 10, 2007

(87) PCT Pub. No.: WO2006/095576
PCT Pub. Date: Sep. 14, 2006

(65) Prior Publication Data
US 2008/0174700 A1    Jul. 24, 2008

(30) Foreign Application Priority Data

Mar. 10, 2005 (JP) .................................. 2005-067325

(51) Int. Cl.
*G09G 5/10* (2006.01)
(52) U.S. Cl. .......................... 345/690; 345/204; 345/89
(58) Field of Classification Search .................. 345/204, 345/690, 87, 89, 98–100, 73–76, 60–63
See application file for complete search history.

(56) References Cited

U.S. PATENT DOCUMENTS

| 6,285,344 | B1 * | 9/2001 | Everard et al. ................. 345/3.1 |
| 6,795,053 | B1 * | 9/2004 | Funamoto et al. ............. 345/102 |
| 6,873,308 | B2 * | 3/2005 | Sagano et al. ................ 345/75.2 |
| 7,209,062 | B1 * | 4/2007 | Lin et al. ...................... 341/139 |
| 7,719,619 | B2 * | 5/2010 | Oka et al. ..................... 348/687 |
| 7,907,134 | B2 * | 3/2011 | Aoki et al. .................... 345/204 |
| 2003/0107682 | A1 | 6/2003 | Sono |
| 2003/0189558 | A1 | 10/2003 | Aoki et al. |
| 2004/0201561 | A1 | 10/2004 | Funamoto et al. |

FOREIGN PATENT DOCUMENTS

| JP | 3215388 | 1/2001 |
| JP | 2004-205785 | 7/2004 |
| JP | 2004-343643 | 12/2004 |

OTHER PUBLICATIONS

Supplementary European Search Report issued Nov. 20, 2009 in Application No. EP 06 71 4463.
International Search Report (in English Language) issued on Mar. 20, 2006 in International Application No. PCT/JP2006/303323.

* cited by examiner

*Primary Examiner* — Duc Dinh
(74) *Attorney, Agent, or Firm* — Wenderoth, Lind & Ponack, L.L.P.

(57) ABSTRACT

A feature detecting circuit 4 detects an average luminance, a white area value and a black area value of a video signal, and a control circuit 5 controls a contrast adjusting circuit 2 such that a contrast gain of the video signal is more moderately increased than decreased according to changes of the detected average luminance, white area value and black area value. As a result, a good video quality can be obtained upon both increasing and decreasing the contrast gain of the video signal to adjust the contrast of the video signal.

12 Claims, 10 Drawing Sheets

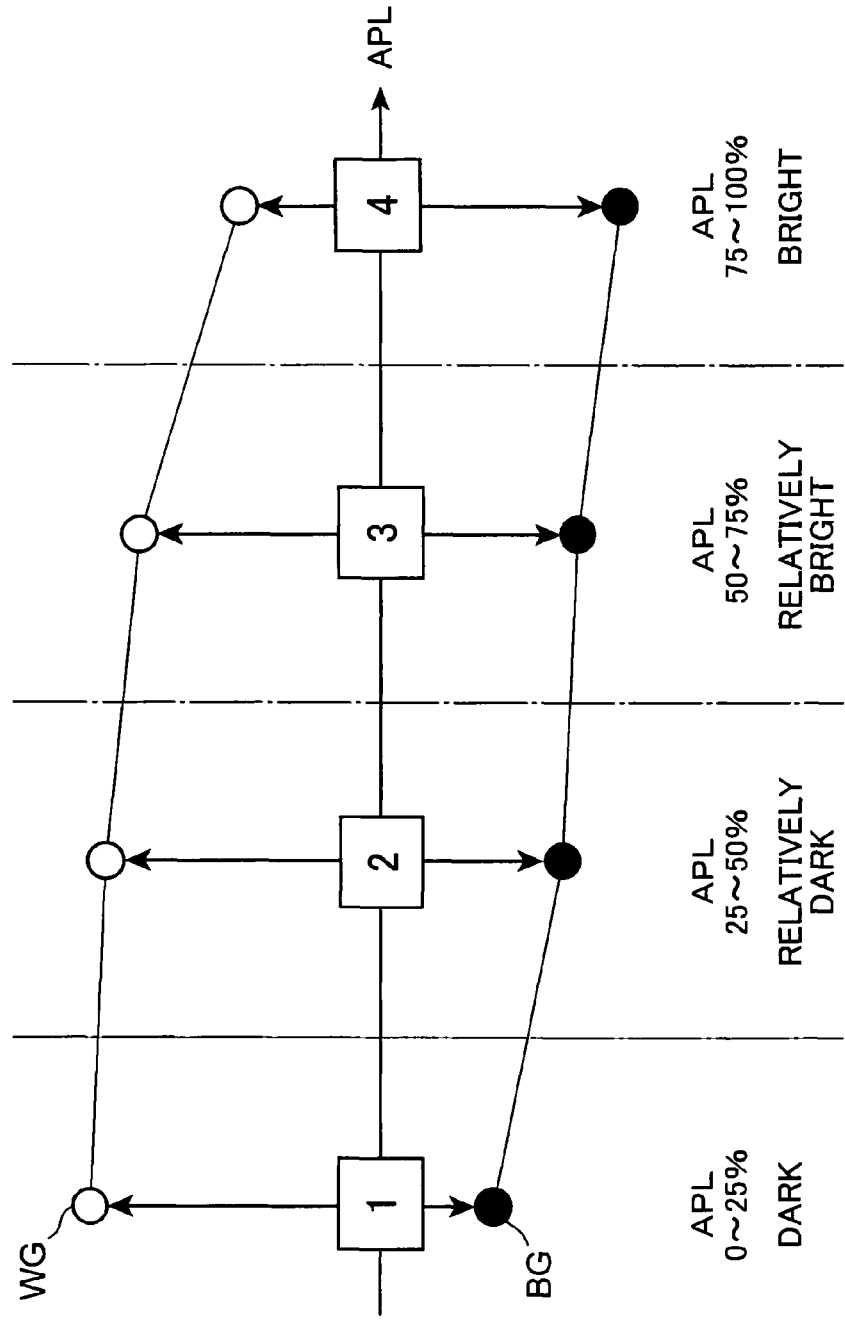

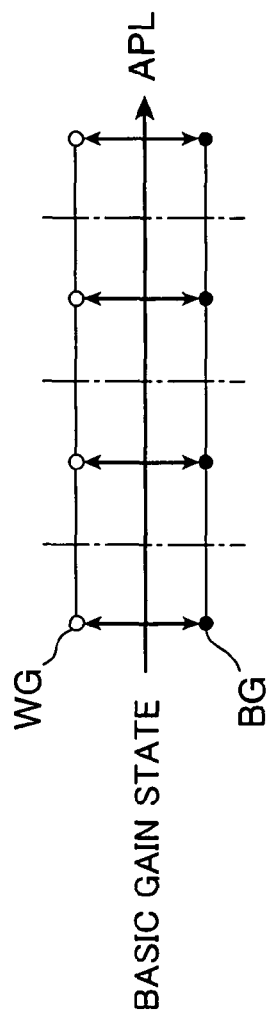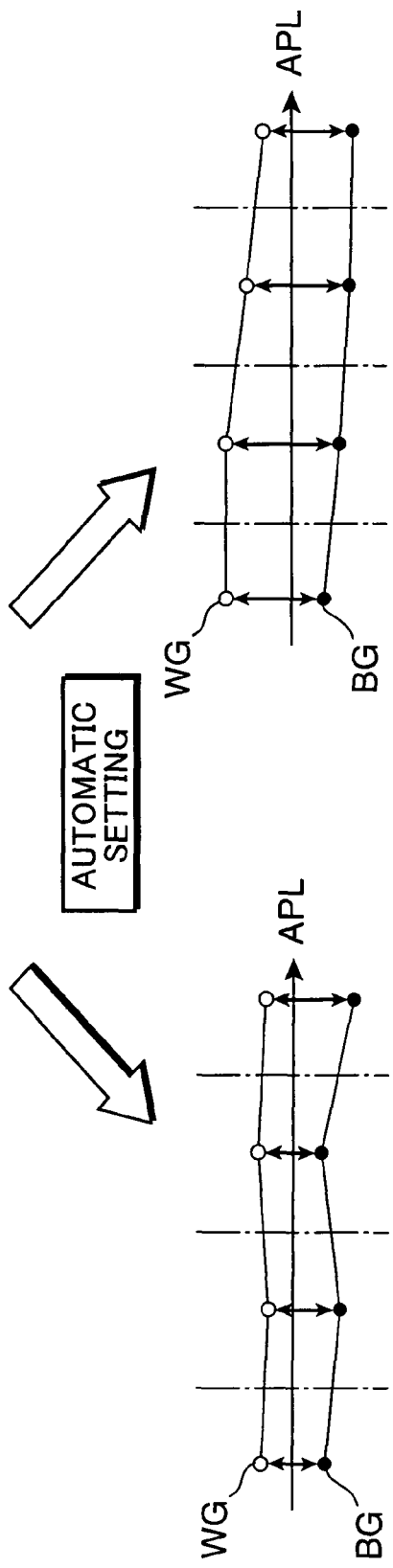

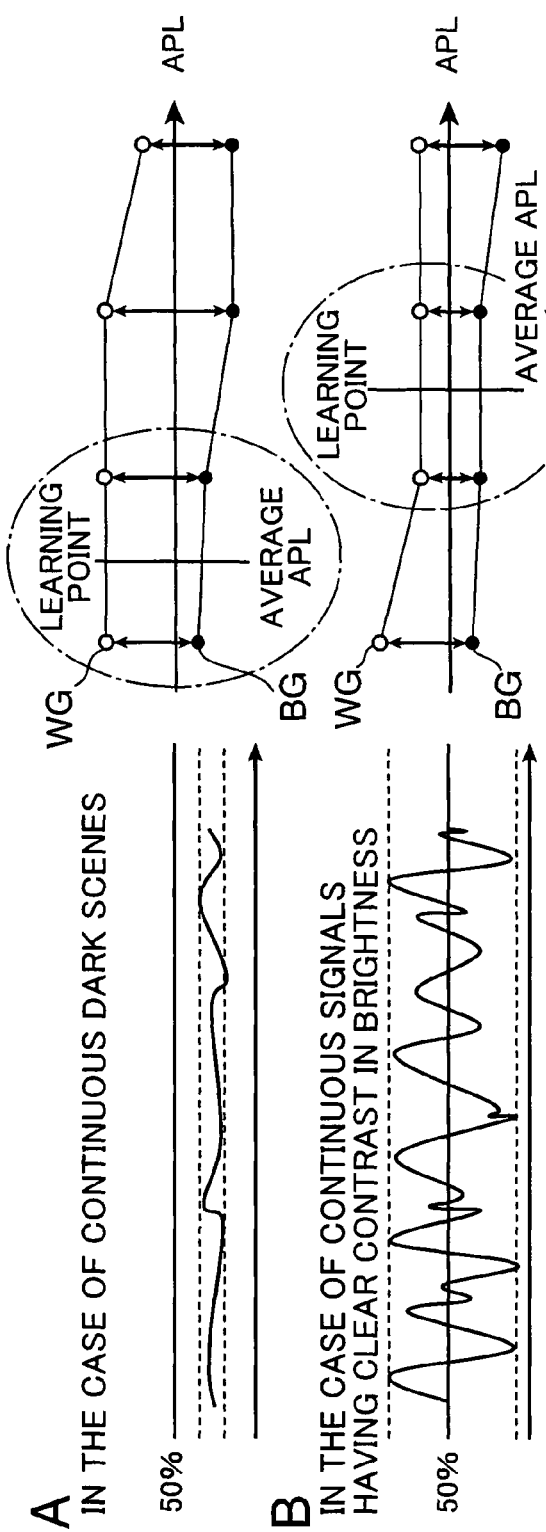
FIG. 9A IN THE CASE OF CONTINUOUS DARK SCENES
FIG. 9B IN THE CASE OF CONTINUOUS SIGNALS HAVING CLEAR CONTRAST IN BRIGHTNESS
FIG. 9C IN THE CASE OF CONTINUOUS SIGNALS HAVING INTERMEDIATE LUMINANCES
FIG. 9D IN THE CASE OF CONTINUOUS SIGNALS HAVING HIGH LUMINANCES

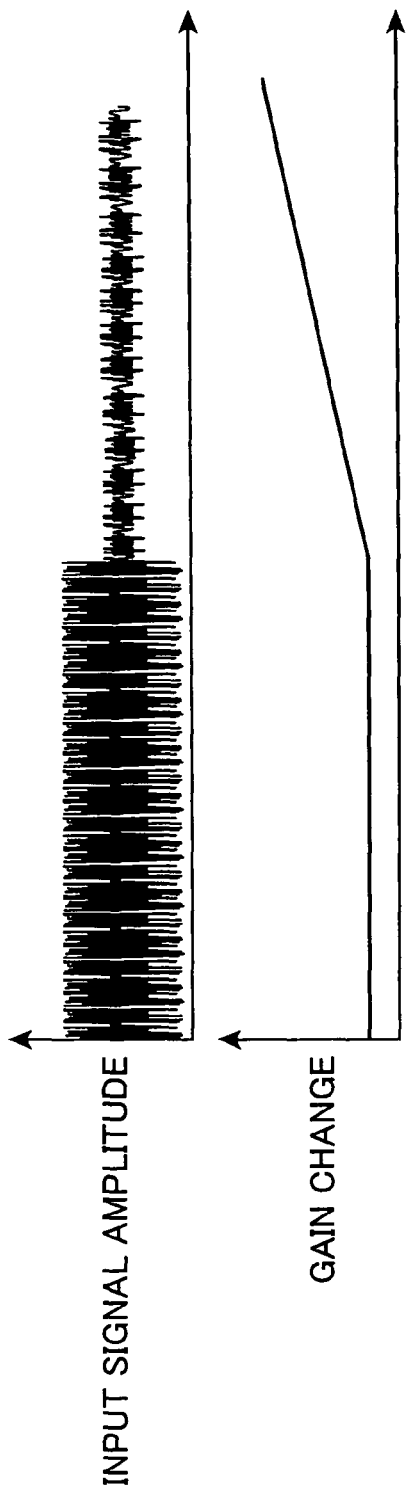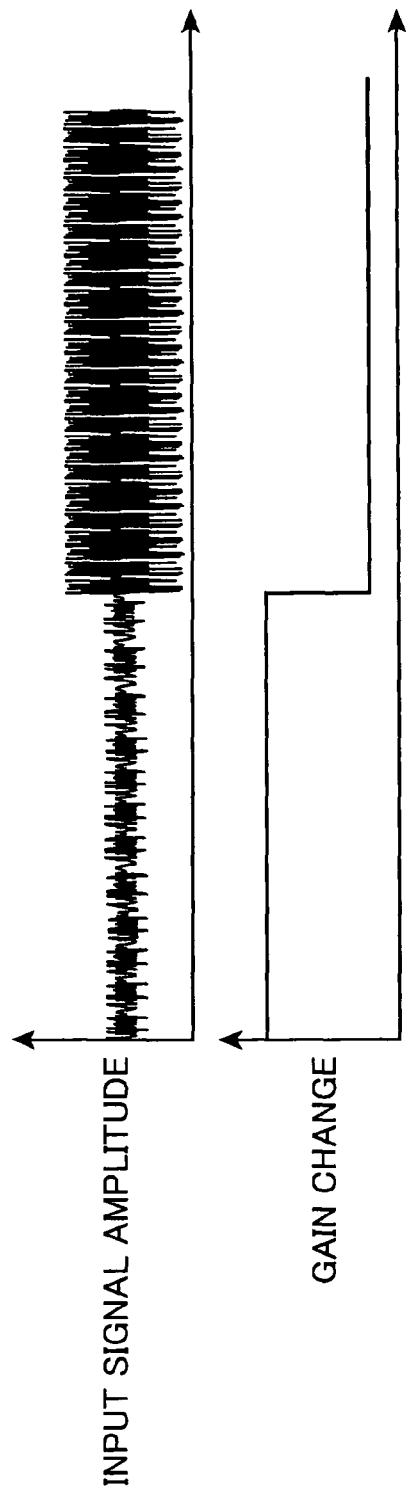

DISPLAY DEVICE, CONTRAST ADJUSTING METHOD AND CONTRAST ADJUSTING PROGRAM

TECHNOLOGICAL FIELD

The present invention relates to a display device for displaying a video image corresponding to a video signal by adjusting the contrast of the video signal, and a contrast adjusting method and a contrast adjusting program therefore.

BACKGROUND ART

In a conventional liquid crystal display device, a gradation correction is carried out by enlarging the dynamic range of the contrast of a video signal, thereby adjusting the contrast of the video signal. For example, patent literature 1 discloses a liquid crystal display device for detecting feature quantities including an average luminance, a maximum luminance and a minimum luminance from a video signal and adjusting a dynamic range, i.e. a contrast gain in accordance with the detection result.

However, in the case of changing the contrast gain in real time in accordance with changes of the feature quantities, the contrast gain frequently switches in a video signal whose brightness drastically changes and this switch is viewed as a flicker by a user, wherefore the video quality is degraded.

In order to prevent the above frequent switch, the contrast gain is switched with a certain time constant. However, even in the case of decreasing the contrast gain, the contrast gain is switched with a delay of only a period of the time constant and a state before the adjustment is kept only for the period of the time constant. Therefore, even in this case, the degradation of the video quality cannot be completely avoided.

Patent Literature 1: Japanese Patent No. 3215388

DISCLOSURE OF THE INVENTION

An object of the present invention is to provide a display device capable of obtaining a good video quality upon both increasing and decreasing the contrast gain of a video signal to adjust the contrast gain of the video signal.

One aspect of the present invention is directed to a display device, comprising adjusting means for adjusting the contrast of a video signal; detecting means for detecting a feature quantity of the video signal; control means for controlling a contrast adjusting operation of the adjusting means according to a change of the feature quantity detected by the detecting means; and display means for displaying a video image using the video signal having the contrast thereof adjusted by the adjusting means, wherein the control means controls the adjusting means such that a contrast gain of the video signal is more moderately increased than decreased according to the change of the feature quantity detected by the detecting means.

In this display device, upon decreasing the contrast gain of the video signal, the contrast gain of the video signal is decreased in a moment according to the change of the feature quantity, whereby a video image suited to the change of the feature quantity can be displayed. Upon increasing the contrast gain of the video signal, the contrast gain of the video signal is moderately increased, whereby a video image suited to the change of the feature quantity can be displayed without being viewed as a flicker. Thus, a good video quality can be obtained upon both increasing and decreasing the contrast gain of the video signal to adjust the contrast of the video signal.

BRIEF DESCRIPTION OF THE DRAWINGS

FIG. 7 is a diagram showing the principle of adjusting the white contrast gain and black contrast gain for a scene by the contrast adjustment process shown in FIG. 2, FIGS. 8A through 8C are diagrams showing an exemplary adjustment result of the white contrast gain and black contrast gain for each scene by the contrast adjustment process shown in FIG. 2, FIGS. 9A through 9D are diagrams showing other exemplary adjustment results of the white contrast gain and black contrast gain for scenes by the contrast adjustment process shown in FIG. 2, and FIGS. 10A and 10B are waveform charts showing an exemplary response characteristic of a gain in relation to amplitude changes of a video signal of the liquid crystal display device shown in FIG. 1.

BEST MODES FOR EMBODYING THE INVENTION

Hereinafter, a display device according to the present invention is described with reference to the accompanying drawings. Although a liquid crystal display device is described as an example of the display device in the following embodiment, the display device to which the present invention is applied is not particularly limited to this example and the present invention is similarly applicable to other display devices such as plasma displays, organic EL (electroluminescence) displays, CRT (cathode-ray tube) displays provided that the contrast thereof is adjustable.

Figure 1:
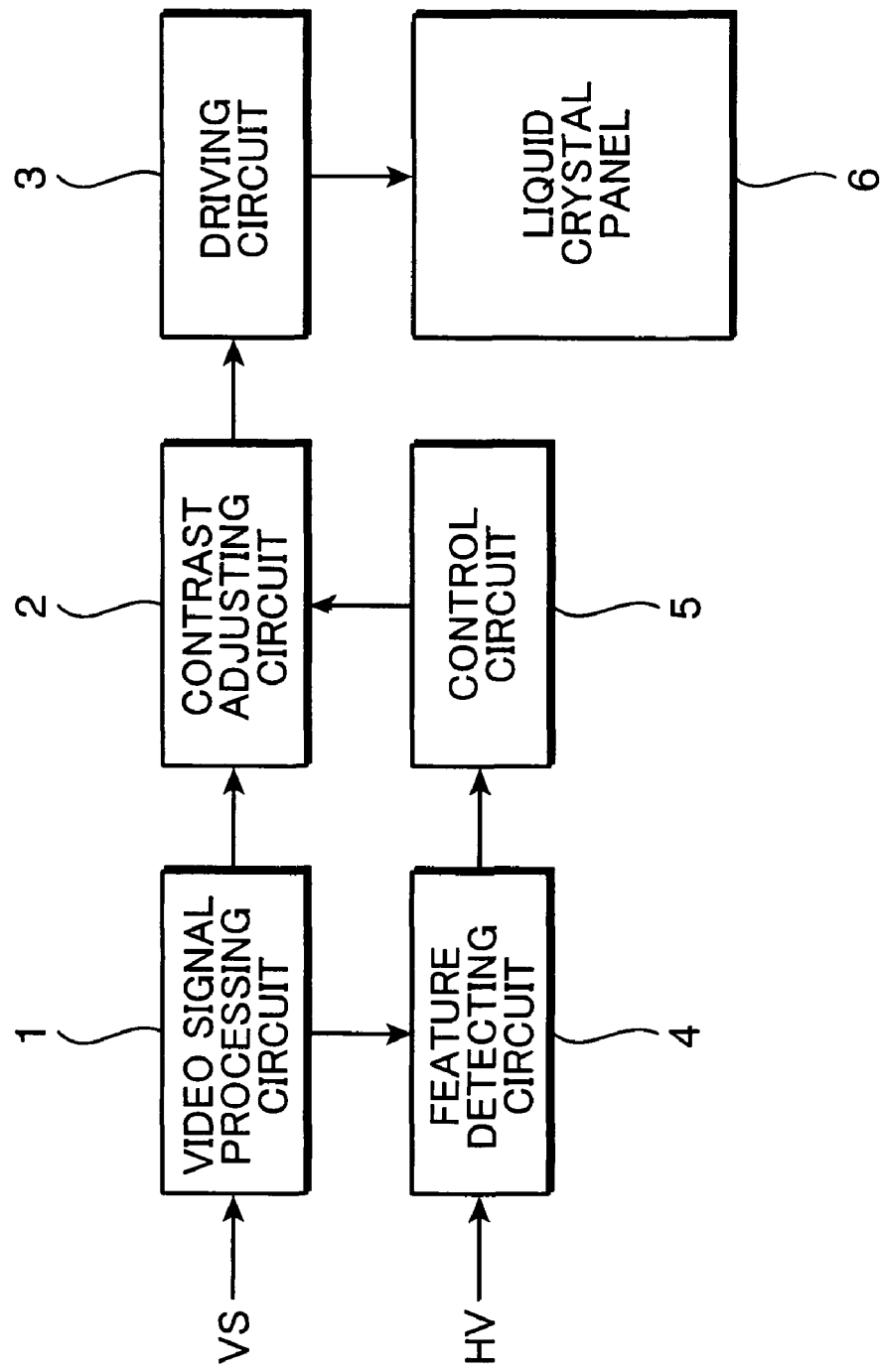
FIG. 1 is a block diagram showing the construction of a liquid crystal display device according to one embodiment of the invention.

FIG. 1 is a block diagram showing the construction of the liquid crystal display device according to one embodiment of the present invention. The liquid crystal display device shown in FIG. 1 is provided with a video signal processing circuit 1, a contrast adjusting circuit 2, a driving circuit 3, a feature detecting circuit 4, a control circuit 5 and a liquid crystal panel 6.

The video signal processing circuit 1 is for receiving a video signal VS, converting it into a video signal suited to be displayed on the liquid crystal panel 6, and outputting the resulting video signal to the contrast adjusting circuit 2 and the feature detecting circuit 4. The feature detecting circuit 4 is for receiving the video signal outputted from the video signal processing circuit 1 and synchronization signals HV such as a vertical synchronization signal and a horizontal synchronization signal of the video signal VS, detecting an average luminance, a white area value and a black area value of the video signal frame by frame as feature quantities representing the features of the scene of the video signal, and outputting the detected feature quantities to the control circuit 5.

Here, the white area value is an area ratio of the video signal belonging to a white-side luminance range located at a white side, out of two areas obtained by halving a luminance range from black level to white level, on a display surface (1 frame period), and the black area value is an area ratio of the video signal belonging to a black-side luminance range located at a black side, out of the two areas obtained by the halving the luminance range from black level to white level, on the display screen.

The control circuit 5 includes a microcomputer provided with an arithmetic processing unit, a memory, etc. and functions as follows by executing a contrast adjusting program stored in the internal memory beforehand by means of the arithmetic processing unit.

Specifically, the control circuit 5 determines a white contrast gain and a black contrast gain of the video signal frame by frame based on the average luminance, the white area value and the black area value and outputs them to the contrast adjusting circuit 2. The contrast adjusting circuit 2 calculates a gain and a DC level of the video signal using the white contrast gain and the black contrast gain, adjusts the video signal outputted from the video signal processing circuit 1 frame by frame using the calculated gain and DC level, and outputs the adjusted video signal to the driving circuit 1.

More specifically, the control circuit 5 sets four average luminance determination ranges by dividing an average luminance range into four, and determines to which one of the four average luminance determination ranges the average luminance detected by the feature detecting circuit 4 belongs. Subsequently, the control circuit 5 latches a maximum white area value, which is a maximum value of the white area value, for each average luminance determination range, determines a white contrast gain characteristic corresponding to the average luminance based on a white area ratio representing a ratio of the white area value to the maximum white area value in each average luminance determination range, determines a white contrast gain corresponding to the average luminance detected by the feature detecting circuit 4 based on the determined white contrast gain characteristic, and controls the contrast adjusting circuit 2 in such a manner as to adjust the gain and DC level of the video signal using the determined white contrast gain. At this time, if the white area value is equal to or below the maximum white area value, the control circuit 5 controls the contrast adjusting circuit 2 in such a manner as to increase the white contrast gain stepwise after the lapse of a specified time (e.g. 5 seconds).

Further, the control circuit 5 latches a maximum white area value, which is a maximum value of the black area value, for each average luminance determination range, determines a black contrast gain characteristic corresponding to the average luminance based on a black area ratio representing a ratio of the black area value to the maximum black area value in each average luminance determination range, determines a black contrast gain corresponding to the average luminance detected by the feature detecting circuit 4 based on the determined black contrast gain characteristic, and controls the contrast adjusting circuit 2 in such a manner as to adjust the gain and DC level of the video signal using the determined black contrast gain. At this time, if the black area value is equal to or below the maximum black area value, the control circuit 5 controls the contrast adjusting circuit 2 in such a manner as to increase the black contrast gain stepwise after the lapse of a specified time (e.g. 5 seconds).

The driving circuit 3 drives the liquid crystal panel 6 using the video signal having the gain and DC level thereof adjusted as described above. The liquid crystal panel 6 displays a video image corresponding to the adjusted video signal.

In this embodiment, the contrast adjusting circuit 2 corresponds to an example of adjusting means; the feature detecting circuit 4 an example of detecting means; the control circuit 5 examples of control means and obtaining means; and the driving circuit 3 and the liquid crystal panel 6 an example of display means. It should be noted that the construction of the control circuit 5 is not particularly limited to the above example and the functions thereof may be partly or entirely carried out by a special hardware circuit.

Figure 2:
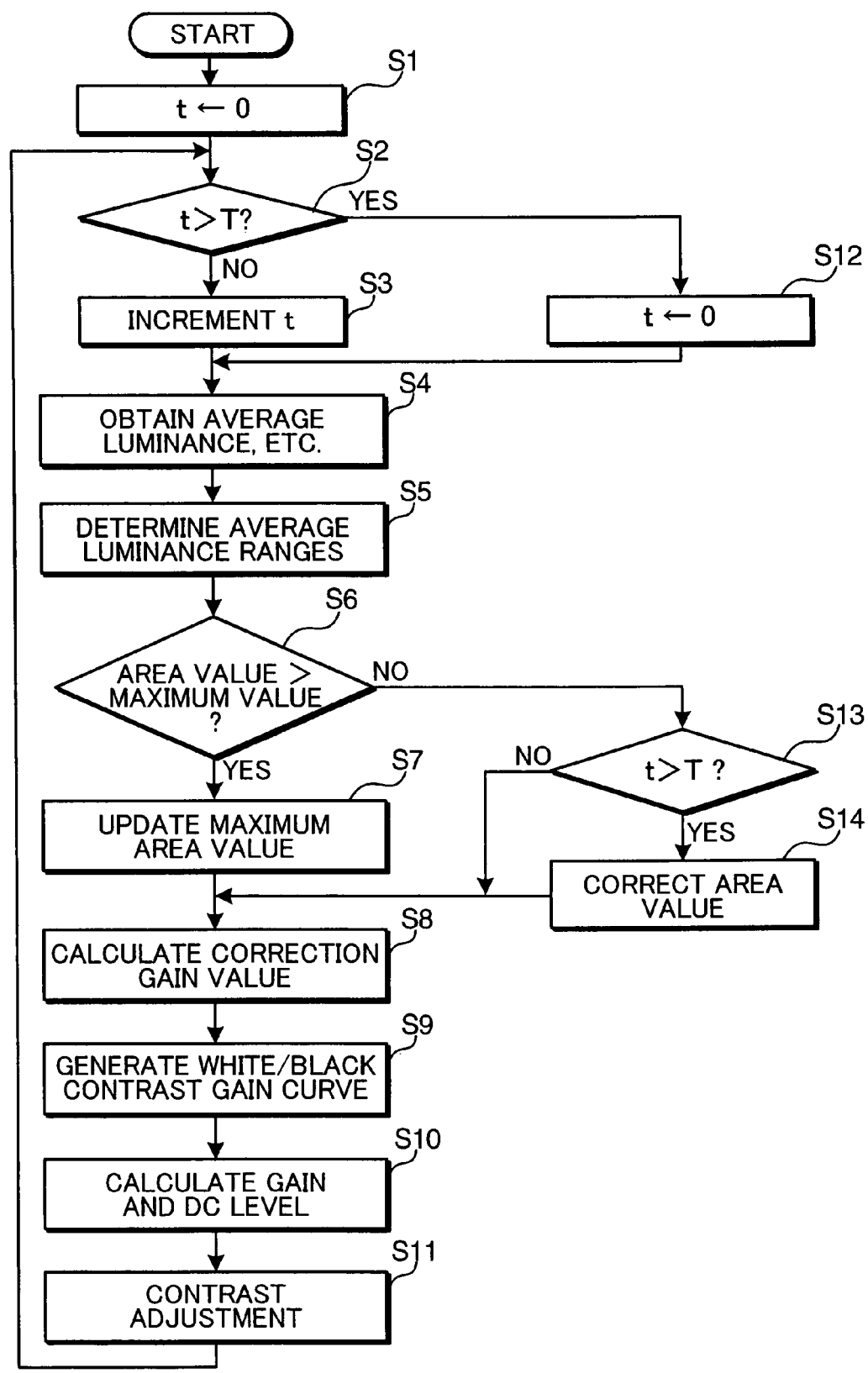
FIG. 2 is a flow chart showing a contrast adjustment process by the liquid crystal display device shown in FIG. 1, FIGS. 3A through 3C are waveform charts showing exemplary average luminance detection process, white detection process and black detection process by a feature detecting circuit shown in FIG. 1.

Next, a contrast adjustment operation of the liquid crystal display device constructed as above is described. FIG. 2 is a flow chart showing a contrast adjustment process by the liquid crystal display device shown in FIG. 1.

As shown in FIG. 2, the control circuit 5 first carries out a specified initialization process and resets a delay time count value t to 0 (Step S1). Subsequently, the control circuit 5 determines whether or not the delay time count value t is larger than a delay time T (e.g. value corresponding to 5 seconds) (Step S2), and resets the delay time count value t to 0 (Step S12) if the delay time count value t is larger than the delay time T. On the other hand, if the delay time count value t is equal to or below the delay time T, the delay time count value t is incremented only by 1 (Step S3).

Subsequently, the control circuit 5 obtains the average luminance, white, area value and black area value of the video signal within one vertical interval detected by an average luminance detection process, a white detection process and a black detection process of the feature detecting circuit 4 from the feature detecting circuit 4 (Step S4).

Figure 3A:
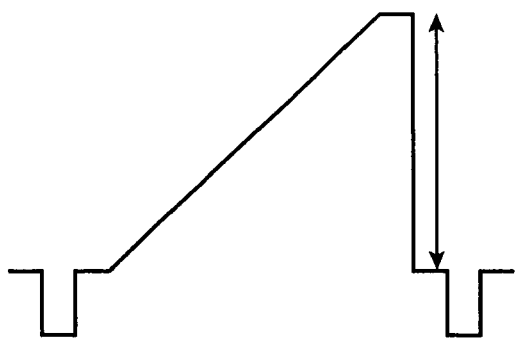
Figure 3B:
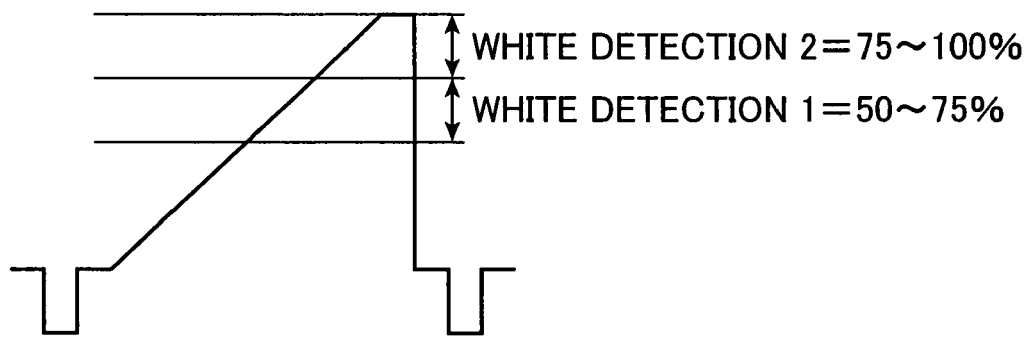
Figure 3C:
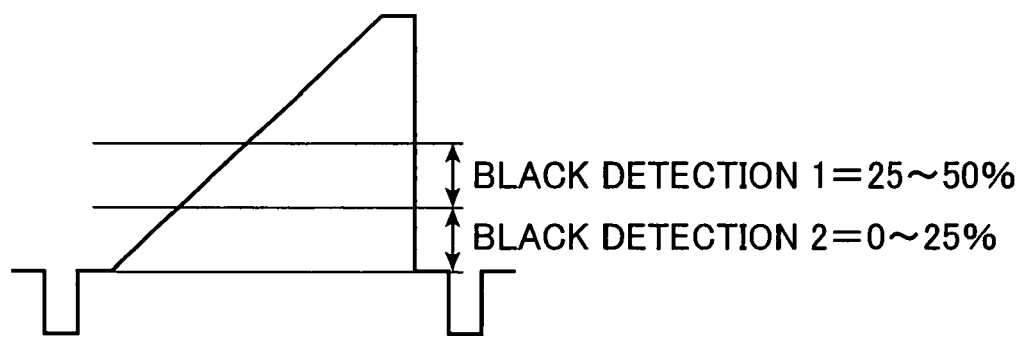

FIGS. 3A through 3C are waveform charts showing exemplary average luminance detection process, white detection process and black detection process by the feature detecting circuit 4 shown in FIG. 1. First, as the average luminance detection process, the average luminance is detected by cumulatively adding the luminance level of the video signal only within one vertical interval. The average luminance is 50% in the case of a video signal whose luminance level changes from black level (0%) to white level (100%) within one horizontal interval as shown in FIG. 3A.

Next, as the white detection process, a first white area value that is an area ratio of the video signal whose luminance level lies in a range from 50%, inclusive, to 75%, exclusive, on the display screen and a second white area value that is an area ratio of the video signal whose luminance level lies in a range from 75%, inclusive, to 100%, inclusive on the display screen are detected, and a sum of the two values becomes the white area value as shown in FIG. 3B. In this example, the first white area value is 25%, the second white area value is 25% and the white area value is 50%.

Finally, as the black detection process, a first black area value that is an area ratio of the video signal whose luminance level lies in a range from 25%, inclusive, to 50%, exclusive, on the display screen and a second black area value that is an area ratio of the video signal whose luminance level lies in a range from 0%, inclusive, to 25%, exclusive on the display screen are detected as shown in FIG. 3C, and a sum of the two values becomes the black area value. In this example, the first black area value is 25%, the second black area value is 25% and the black area value is 50%. It should be noted that the method for determining the white area value and the black area value is not particularly limited to the above example, and various changes can be made, for example, by changing the range of the luminance level or by dividing the white side and the black side into three or more.

Next, the control circuit 5 determines to which one of the four average luminance determination ranges the average luminance detected by the feature detecting circuit 4 belongs (Step S5). The average luminance determination ranges are generated by dividing the average luminance range into four, wherein the first average luminance determination range is a range from 0%, inclusive, to 25%, exclusive, of the luminance level, the second average luminance determination range is a range from 25%, inclusive, to 50%, exclusive, of the luminance level, the third average luminance determination range is a range from 50%, inclusive, to 75%, exclusive, of the luminance level, and the fourth average luminance determination range is a range from 75%, inclusive, to 100%, inclusive, of the luminance level. It should be noted that the number and spans of the average luminance determination ranges are not particularly limited to the above example, and various changes can be made such as the use of five or more average luminance determination ranges.

Subsequently, as a process for the white contrast gain, the control circuit 5 compares the white area value of the average luminance determined to belong to which one of the four average luminance determination ranges and the past maximum white area value of the average luminance determination range to which the average luminance was determined to belong, and judges whether or not the detected white area value is larger than the past maximum white area value (Step S6). It should be noted that, for the first comparison, a maximum white area value stored as an initial value beforehand is used.

If the detected white area value is larger than the past maximum white area value, the detected white area value is latched as the maximum white area value to update the maximum white area value (Step S7). On the other hand, if the detected white area value is equal to or below the past maximum white area value, the control circuit 5 judges whether or not the delay time count value t is larger than the delay time T (Step S13), and sets a value obtained by subtracting a specified value (e.g. 1 LSB of a register for storing the maximum white area value) from the past maximum white area value as the white area value to correct the white area value (Step S14) only if the delay time count value t is larger than the delay time T. Accordingly, if the detected white area value is equal to or below the past maximum white area value, the white contrast gain to be described later is calculated using the white area value obtained by subtracting the specified value from the past maximum white area value after the lapse of a specified time, and the white contrast gain is increased stepwise.

Subsequently, the control circuit 5 calculates a white past maximum ratio by dividing the white area value by the maximum white area value, calculates a white correction gain value B as a basis in accordance with the average luminance, calculates a corrected white correction gain B' in accordance with the following equation, calculates a white contrast gain D based on the first white area value from the corrected white correction gain B' and calculates a white contrast gain F based on the second white area value from the calculated D (Step S8). It should be noted that, for the first calculations, a white correction gain value stored as an initial value beforehand is used. An output coefficient below is a coefficient representing a multiplication factor with which a learning result is multiplied with the correction gain.

Corrected white correction gain value B'=white correction gain value B (1−white past maximum ratio×output coefficient).

Figure 4:
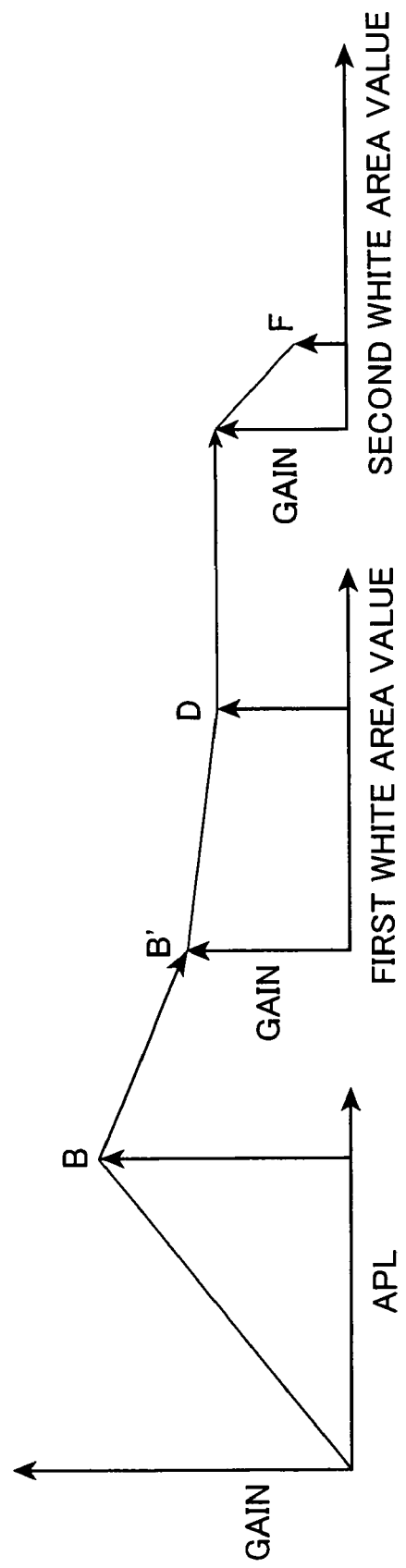
FIG. 4 is a diagram showing a white contrast gain calculation method by a control circuit shown in FIG. 1, FIGS. 5A and 5B are graphs conceptually showing a contrast gain curve generation method.

FIG. 4 is a diagram showing a method for calculating the white contrast gain by the control circuit 5 shown in FIG. 1. It should be noted that APL in FIG. 4 denotes average luminance and this also applies to other figures.

As shown in FIG. 4, the white correction gain value B based on the average luminance is calculated; the corrected white correction gain value B' is calculated using the calculated value B; the white contrast gain D based on the first white area value is calculated using the calculated value B' and the white contrast gain F based on the second white area value is calculated as the white contrast gain using the calculated value D. Here, the white past maximum ratio of the above equation (1−white past maximum ratio×output coefficient) is updated in accordance with the past video signals, and this part serves as the learning function.

By the above process, the white contrast gain is determined for the average luminance determination range to which the average luminance is determined to belong. By repeating this process, four white contrast gains are determined for the four average luminance determination ranges, and the control circuit 5 generates a white contrast gain curve representing a white contrast gain characteristic in relation to the average luminance by interpolation using the four white contrast gains based on a contrast gain curve generation method described below (Step S9).

Figure 5A:
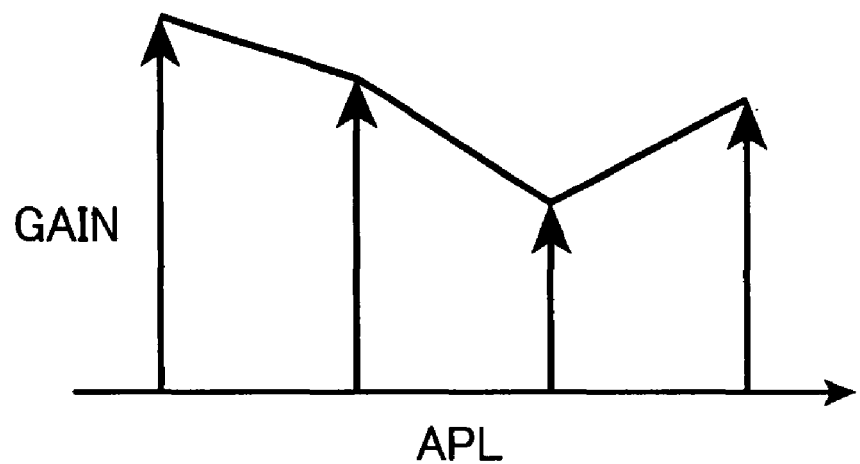
Figure 5B:
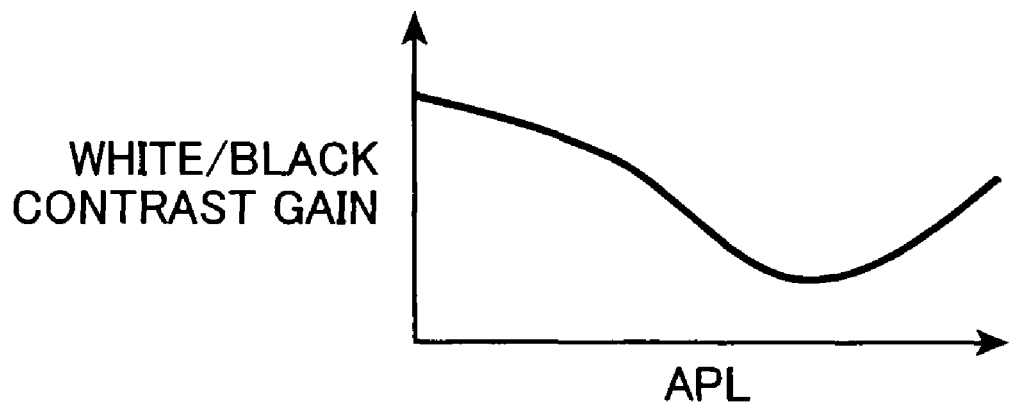

FIGS. 5A and 5B are graphs conceptually showing the contrast gain curve generation method. As shown in FIG. 5A, the white contrast gain values are determined for the four average luminance determination ranges by the above process, and the white contrast gain curve representing the white contrast gain characteristic in relation to the average luminance is determined as shown in FIG. 5B by interpolation using the four white contrast gain values.

In parallel to the above process for the white contrast gains, the process for black contrast gains is performed and the control circuit 5 compares the black area value of the average luminance determined to belong to which one of the four average luminance determination ranges and the past maximum black area value of the average luminance determination range to which the average luminance was determined to belong, and judges whether or not the detected black area value is larger than the past maximum black area value (Step S6).

If the detected black area value is larger than the past maximum black area value, the detected black area value is latched as the maximum black area value to update the maximum black area value (Step S7). On the other hand, if the detected black area value is equal to or below the past maximum black area value, the control circuit 5 judges whether or not the delay time count value t is larger than the delay time T (Step S13), and sets a value obtained by subtracting a specified value (e.g. 1 LSB of a register for storing the maximum black area value) from the past maximum black area value as the black area value to correct the black area value (Step S14) only if the delay time count value t is larger than the delay time T. Accordingly, if the black area value is equal to or below the past maximum black area value, the black contrast gain to be described later is calculated using the black area value obtained by subtracting the specified value from the past maximum black area value after the lapse of a specified time, and the black contrast gain is increased stepwise.

Subsequently, the control circuit 5 calculates a black past maximum ratio by dividing the black area value by the maximum black area value, calculates a black correction gain value A as a basis in accordance with the average luminance, calculates a corrected black correction gain A' in accordance with the following equation, calculates a black contrast gain C based on the first black area value from the corrected black correction gain A' and calculates a black contrast gain E based on the second black area value from the calculated C (Step S8).

Corrected black correction gain value $A'$=black correction gain value $A$ (1−black past maximum ratio×output coefficient).

By the above process, the black contrast gain is determined for the average luminance determination range to which the average luminance is determined to belong. By repeating this process, four black contrast gains are determined for the four average luminance determination ranges, and the control circuit 5 generates a black contrast gain curve (see FIG. 5B) representing a black contrast gain characteristic in relation to the average luminance by interpolation using the four black contrast gains in the same manner as above (Step S9).

Figure 6A:
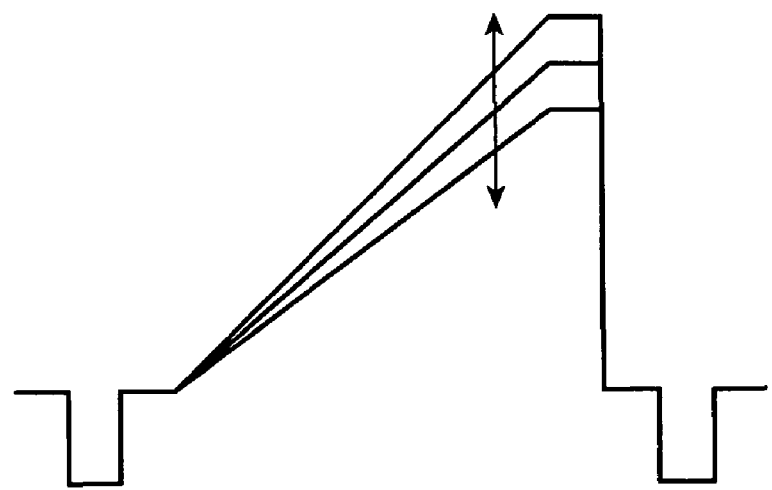
FIGS. 6A and 6B are waveform charts showing a white contrast gain and a black contrast gain.
Figure 6B:
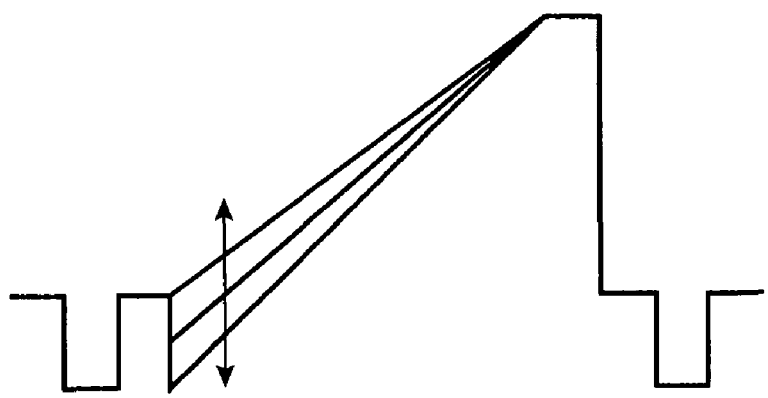

FIG. 6 are waveform charts showing the white contrast gain and the black contrast gain. The gain of the video signal is controlled at the white side with the black level fixed in accordance with the white contrast gain calculated as above as shown in FIG. 6A, and the gain of the video signal is controlled at the black side with the white level (white peak) fixed in accordance with the black contrast gain calculated as above as shown in FIG. 6B. By suitably controlling these two contrast gains according to the scenes of the video signals, the contrast of the video signals can be optimally adjusted according to various scenes.

Next, the contrast adjusting circuit 2 calculates the gain (white gain) and DC level of the video signal in accordance with the following equation using the white contrast gain F and black contrast gain E outputted from the control circuit 5 (Step S10).

Gain=reference value×(input value of video signal+$F$+$E$)/(input value of video signal)

DC level=reference value−$E$

Next, the contrast adjusting circuit 2 adjusts the video signal using the calculated gain and DC level and outputs the adjusted video signal to the driving circuit 3 (Step S11). Thereafter, this routine returns to Step S2 to repeat the above process frame by frame.

FIG. 7 is a diagram showing the adjustment principle of the white contrast gain and black contrast gain for scenes by the contrast adjustment process shown in FIG. 2. As shown in FIG. 7, the average luminances are detected in the four first to fourth average luminance determination ranges 1 to 4, white contrast gains WG (white circles in FIG. 7) and black contrast gains BG (black circles in FIG. 7) are automatically set according to a scene represented by the video signal inputted by the above contrast adjustment process, and the contrast of the video signal is optimally adjusted according to the scene.

FIGS. 8A through 8C are diagrams showing exemplary adjustment results of the white contrast gains and black contrast gains for the respective scenes by the contrast adjustment process shown in FIG. 2. From a basic gain state shown in FIG. 8A, the white contrast gains WG and black contrast gains BG shown in FIG. 8B are automatically set for a video signal representing a scene of variety show, news or the like, and the white contrast gains WG and black contrast gains BG shown in FIG. 8C are automatically set for a video signal representing a scene of movie, drama, landscape or the like. In this way, the gain is reduced in the respective average luminance determination ranges in such a manner as not to exceed the dynamic range if the video signal represents an image with much vividness such as the one of variety show, news or the like, and a state of large gain close to the basic gain state is set if the video signal represents an image with less vividness such as the one of movie, drama, landscape or the like.

FIGS. 9A through 9D are diagrams showing other exemplary examples of the adjustment results of the white contrast gains and black contrast gains for the respective scenes by the contrast adjustment process shown in FIG. 2. If dark scenes continue as shown in FIG. 9A, the first and second average luminance determination ranges mainly serve as learning points, and the white contrast gains WG and black contrast gains BG are adjusted as shown mainly based on the average luminances, white area values and black area values belonging to the first and second average luminance determination ranges. If video signals having clear contrast in brightness continue as shown in FIG. 9B, the second and third average luminance determination ranges mainly serve as learning points, and the white contrast gains WG and black contrast gains BG are adjusted to be smaller as shown mainly based on the average luminances, white area values and black area values belonging to the second and third average luminance determination ranges. If video signals having intermediate luminances continue as shown in FIG. 9C, the second and third average luminance determination ranges mainly serve as learning points, and the white contrast gains WG and black contrast gains BG are adjusted to be larger as shown mainly based on the average luminances, white area values and black area values belonging to the second and third average luminance determination ranges. If video signals having high luminances continue as shown in FIG. 9D, the third and fourth average luminance determination ranges mainly serve as learning points, and the white contrast gains WG and black contrast gains BG are adjusted as shown mainly based on the average luminances, white area values and black area values belonging to the third and fourth average luminance determination ranges.

FIGS. 10A and 10B are waveform charts showing exemplary gain response characteristics in relation to the amplitude change of the video signal of the liquid crystal display device shown in FIG. 1. As shown in FIG. 10A, if the amplitude of the video signal becomes smaller, the gain is increased by the specified value if the delay time count value t becomes larger than the delay time T, wherefore the gain moderately increases. On the other hand, if the amplitude of the video signal becomes larger as shown in FIG. 10B, the gain decreases in a moment.

As described above, in this embodiment, the average luminance, white area value and black area value of a video signal are detected, the contrast gain of the video signal is more moderately increased than decreased when the contrast of the video signal is adjusted according to changes of the detected average luminance, white area value and black area value, and a video image corresponding to the thus adjusted video signal is displayed. Accordingly, upon decreasing the contrast gain of the video signal, the contrast gain of the video signal can be decreased in a moment according to changes of the average luminance, white area value and black area value so that a video image suited to the change of the scene can be displayed. Further, upon increasing the contrast gain of the video signal, the contrast gain of the video signal is moderately increased, so that a video image suited to the changes of the feature quantities can be displayed without being viewed as a flicker. As a result, a good video quality can be obtained upon both increasing and decreasing the contrast gain of the video signal to adjust the contrast of the video signal.

Further, the average luminance range is divided to set the four average luminance determination ranges and the contrast of the video signal is adjusted according to changes of the average luminances in the respective average luminance determination ranges, wherefore the contrast of the video signal can be satisfactorily and finely adjusted according to various scenes such as scenes with high average luminances, scenes with low average luminances and scenes with intermediate average luminances.

Furthermore, the maximum white area values and the maximum black area values are latched, the white contrast gain curve and black contrast gain curve in relation to the average luminance are determined based on the white area ratios and black area ratios representing the ratios of the white area values and black area values to the maximum white area values and maximum black area values in the respective average luminance determination ranges, the white contrast gain and black contrast gain corresponding to the detected average luminance are determined based on the determined white contrast gain curve and black contrast gain curve, and the gain and DC level of the video signal are adjusted using the determined white contrast gain and black contrast gain. Thus, the contrast of the video signal can be satisfactorily adjusted according to the features of the scene based on the average luminance and the luminance variation while a sufficient dynamic range is ensured.

As described above, a display device according to the present invention comprises adjusting means for adjusting the contrast of a video signal; detecting means for detecting a feature quantity of the video signal; control means for controlling a contrast adjusting operation of the adjusting means according to a change of the feature quantity detected by the detecting means; and display means for displaying a video image using the video signal having the contrast thereof adjusted by the adjusting means, wherein the control means controls the adjusting means such that a contrast gain of the video signal is more moderately increased than decreased according to the change of the feature quantity detected by the detecting means.

In the display device according to the present invention, the feature quantity of the video signal is detected, and the contrast gain of the video signal is more moderately increased than decreased according to the change of the detected feature quantity when the contrast of the video signal is adjusted according to the change of the detected feature quantity, and the video image is displayed using the thus adjusted video signal. Accordingly, upon decreasing the contrast gain of the video signal, the contrast gain of the video signal is decreased in a moment according to the change of the feature quantity, whereby a video image suited to the change of the feature quantity can be displayed. Upon increasing the contrast gain of the video signal, the contrast gain of the video signal is moderately increased, whereby a video signal suited to the change of the feature quantity can be displayed without being viewed as a flicker. As a result, a good video quality can be obtained upon both increasing and decreasing the contrast gain of the video signal to adjust the contrast of the video signal.

It is preferable that the detecting means detects an average luminance of the video signal; and that the control means determines to which one of a plurality of average luminance determination ranges set by dividing an average luminance range the average luminance detected by the detecting means belongs and controls the adjusting means to adjust the contrast of the video signal according to the changes of the average luminances in the respective average luminance determination ranges.

In this case, the average luminance of the video signal is detected, it is determined to which one of the plurality of average luminance determination ranges the detected average luminance belongs, and the contrast of the video signal is adjusted according to the changes of the average luminances in the respective average luminance determination ranges. Thus, the contrast of the video signal can be satisfactorily adjusted according to scenes such as those with high average luminances and those with low average luminances.

The plurality of average luminance determination ranges are preferably four or more average luminance determination ranges set by dividing the average luminance range. In this case, since four or more average luminance determination ranges are set and the contrast of the video signal is adjusted according to the changes of the average luminances in the respective average luminance determination ranges, the contrast of the video signal can be satisfactorily and finely adjusted according to various scenes such as those with high average luminances, those with low average luminances and those with intermediate average luminances.

It is preferable that the detecting means detects a white area value representing an area ratio of the video signal belonging to a white-side luminance range located at a white side out of a luminance range from black level to white level on a display screen together with the average luminance; and that the control means controls the adjusting means to adjust a white contrast gain of the video signal based on the white area value of the average luminance determined to belong to each average luminance determination range in each average luminance determination range.

In this case, the white area value representing the area ratio of the video signal belonging to the white-side luminance range located at the white side out of the luminance range from the black level to the white level on the display screen is detected together with the average luminance, and the white contrast gain of the video signal is adjusted based on the white area value of the average luminance determined to belong to each average luminance determination range in each average luminance determination range. Thus, not only the average luminance, but also a part having a momentarily high luminance can be considered. Therefore, the contrast of the video signal can be satisfactorily adjusted according to not only the feature of the scene based on the average luminance, but also the feature of the scene based on a luminance variation within a short period of time.

The control means preferably latches a maximum white area value that is a maximum value of the white area value in each average luminance determination range, determines a white contrast gain characteristic in relation to the average luminance based on a white area ratio representing the ratio of the white area value to the maximum white area value in each average luminance determination range, determines a white contrast gain corresponding to the average luminance detected by the detecting means based on the determined white contrast gain characteristic, and controls the adjusting means to adjust the contrast of the video signal based on the determined white contrast gain.

In this case, the maximum white area value is latched for each average luminance determination range, the white contrast gain characteristic in relation to the average luminance is determined based on the white area ratio representing the ratio of the white area value to the maximum white area value in each average luminance determination range, the white contrast gain corresponding to the detected average luminance is determined based on the determined white contrast gain characteristic, and the contrast of the video signal is adjusted using the determined white contrast gain. Thus, the contrast of the video signal can be satisfactorily adjusted according to the feature of the scene based on the average luminance and the luminance variation while a sufficient dynamic range is ensured.

The control means preferably controls the adjusting means to increase the white contrast gain stepwise after the lapse of a specified time if the white area value is equal to or smaller than the maximum white area value. In this case, if the white area value is equal to or smaller than the maximum white area value, i.e. if the white contrast gain needs to be increased, the white contrast gain is increased stepwise after the lapse of the specified time. Thus, the white contrast gain can be moderately increased only if the white contrast gain needs to be increased.

It is preferable that the detecting means detects a black area value representing an area ratio of the video signal belonging to a black-side luminance range located at a black side out of a luminance range from black level to white level on a display screen together with the average luminance; and that the control means controls the adjusting means to adjust a black contrast gain of the video signal based on the black area value of the average luminance determined to belong to each average luminance determination range in each average luminance determination range.

In this case, the black area value representing the area ratio of the video signal belonging to the black-side luminance range located at the black side out of the luminance range from the black level to the black level on the display screen is detected together with the average luminance, and the black contrast gain of the video signal is adjusted based on the black area value of the average luminance determined to belong to each average luminance determination range in each average luminance determination range. Thus, not only the average luminance, but also a part having a momentarily low luminance can be considered. Therefore, the contrast of the video signal can be satisfactorily adjusted according to not only the feature of the scene based on the average luminance, but also the feature of the scene based on a luminance variation within a short period of time.

The control means preferably latches a maximum black area value that is a maximum value of the black area value in each average luminance determination range, determines a black contrast gain characteristic based on a black area ratio representing the ratio of the black area value to the maximum black area value in each average luminance determination range, determines a black contrast gain corresponding to the average luminance detected by the detecting means based on the determined black contrast gain characteristic, and controls the adjusting means to adjust the contrast of the video signal based on the determined black contrast gain.

In this case, the maximum black area value is latched for each average luminance determination range, the black contrast gain characteristic in relation to the average luminance is determined based on the black area ratio representing the ratio of the black area value to the maximum black area value in each average luminance determination range, the black contrast gain corresponding to the detected average luminance is determined based on the determined black contrast gain characteristic, and the contrast of the video signal is adjusted using the determined black contrast gain. Thus, the contrast of the video signal can be satisfactorily adjusted according to the feature of the scene based on the average luminance and the luminance variation while a sufficient dynamic range is ensured.

The control means preferably controls the adjusting means to increase the black contrast gain stepwise after the lapse of a specified time if the black area value is equal to or smaller than the maximum black area value. In this case, if the black area value is equal to or smaller than the maximum black area value, i.e. if the black contrast gain needs to be increased, the black contrast gain is increased stepwise after the lapse of the specified time. Thus, the black contrast gain can be moderately increased only if the black contrast gain needs to be increased.

It is preferable that the display means includes a liquid crystal display panel, and that the display device is a liquid crystal display device. In this case, a good video quality can be obtained using the liquid crystal display device having a narrow contrast adjustment range.

A contrast adjusting method for a display device according to the present invention comprises a detection step of detecting a feature quantity of a video signal; an adjustment step of adjusting the contrast of the video signal according to a change of the feature quantity detected in the detection step; and a display step of displaying a video image using the video signal adjusted in the adjustment step, wherein, in the adjustment step, the contrast gain of the video signal is more moderately increased than decreased according to the change of the feature quantity detected in the detection step.

A contrast adjusting program for a display device according to the present invention causes a microcomputer built in the display device comprising detecting means for detecting a feature quantity of a video signal, adjusting means for adjusting the contrast of the video signal, and display means for displaying a video image using the video signal adjusted by the adjusting means to function as obtaining means for obtaining the feature quantity detected by the detecting means; and control means for controlling a contrast adjusting operation of the adjusting means according to a change of the feature quantity obtained by the obtaining means, wherein the control means controls the adjusting means such that the contrast gain of the video signal is more moderately increased than decreased according to the change of the feature quantity obtained by the obtaining means.

INDUSTRIAL APPLICABILITY

A display device according to the present invention can provide a good video quality upon both increasing and decreasing a contrast gain of a video signal to adjust the contrast of the video signal and is, therefore, useful as a display device for displaying a video image while adjusting the contrast of a video signal or the like.

What is claimed is:
1. A display device, comprising:
an adjusting portion for adjusting the contrast of a video signal;
a detecting portion for detecting a feature quantity of the video signal;
a control portion for controlling a contrast adjusting operation of the adjusting portion according to a change of the feature quantity detected by the detecting portion; and
a display portion for displaying a video image using the video signal having the contrast thereof adjusted by the adjusting portion,
wherein the control portion controls the adjusting portion in such a manner that changes over time of a contrast gain when increasing the contrast gain of the video signal according to the change of the feature quantity detected by the detecting portion are more gradual than changes over time of the contrast gain when decreasing the contrast gain of the video signal according to the change in the feature quantity detected by the detecting portion.
2. A display device according to claim 1, wherein:
the detecting portion detects an average luminance of the video signal; and the control portion determines to which one of a plurality of average luminance determination ranges set by dividing an average luminance range the average luminance detected by the detecting portion belongs and controls the adjusting portion to adjust the contrast of the video signal according to the changes of the average luminances in the respective average luminance determination ranges.

3. A display device according to claim 2, wherein the plurality of average luminance determination ranges are four or more average luminance determination ranges set by dividing the average luminance range.

4. A display device according to claim 2, wherein:
the detecting portion detects a white area value representing an area ratio of the video signal belonging to a white-side luminance range located at a white side out of a luminance range from black level to white level on a display screen together with the average luminance; and
the control portion controls the adjusting portion to adjust a white contrast gain of the video signal based on the white area value of the average luminance determined to belong to each average luminance determination range in each average luminance determination range.

5. A display device according to claim 4, wherein the control portion latches a maximum white area value that is a maximum value of the white area value in each average luminance determination range, determines a white contrast gain characteristic in relation to the average luminance based on a white area ratio representing the ratio of the white area value to the maximum white area value in each average luminance determination range, determines a white contrast gain corresponding to the average luminance detected by the detecting portion based on the determined white contrast gain characteristic, and controls the adjusting portion to adjust the contrast of the video signal based on the determined white contrast gain.

6. A display device according to claim 5, wherein the control portion controls the adjusting portion to increase the white contrast gain stepwise after the lapse of a specified time if the white area value is equal to or smaller than the maximum white area value.

7. A display device according to claim 2, wherein:
the detecting portion detects a black area value representing an area ratio of the video signal belonging to a black-side luminance range located at a black side out of a luminance range from black level to white level on a display screen together with the average luminance; and
the control portion controls the adjusting portion to adjust a black contrast gain of the video signal based on the black area value of the average luminance determined to belong to each average luminance determination range in each average luminance determination range.

8. A display device according to claim 7, wherein the control portion latches a maximum black area value that is a maximum value of the black area value in each average luminance determination range, determines a black contrast gain characteristic based on a black area ratio representing the ratio of the black area value to the maximum black area value in each average luminance determination range, determines a black contrast gain corresponding to the average luminance detected by the detecting portion based on the determined black contrast gain characteristic, and controls the adjusting portion to adjust the contrast of the video signal based on the determined black contrast gain.

9. A display device according to claim 8, wherein the control portion controls the adjusting portion to increase the black contrast gain stepwise after the lapse of a specified time if the black area value is equal to or smaller than the maximum black area value.

10. A display device according to claim 1, wherein:
the display portion includes a liquid crystal display panel; and
the display device is a liquid crystal display device.

11. A contrast adjusting method for a display device, comprising:
a detection step of detecting a feature quantity of a video signal;
an adjustment step of adjusting the contrast of the video signal according to a change of the feature quantity detected in the detection step; and
a display step of displaying a video image using the video signal adjusted in the adjustment step,
wherein, in the adjustment step, the contrast gain of the video signal is adjusted in such a manner that changes over time of the contrast gain when increasing the contrast gain of the video signal according to the change of the feature quantity detected in the detection step are more gradual than changes over time of the contrast gain when decreasing the contrast gain of the video signal according to the change in the feature quantity detected in the detection step.

12. A non-transitory computer-readable recording medium storing a contrast adjusting program for a display device causing a microcomputer built in the display device comprising a detecting portion for detecting a feature quantity of a video signal, an adjusting portion for adjusting the contrast of the video signal, and a display portion for displaying a video image using the video signal adjusted by the adjusting portion to function at least as:
an obtaining portion for obtaining the feature quantity detected by the detecting portion; and
a control portion for controlling a contrast adjusting operation of the adjusting portion according to a change of the feature quantity obtained by the obtaining portion,
wherein the control portion controls the adjusting portion in such a manner that changes over time of a contrast gain when increasing the contrast gain of the video signal according to the change of the feature quantity obtained by the obtaining portion are more gradual than changes over time of the contrast gain when decreasing the contrast gain of the video signal according to the change in the feature quantity obtained by the obtaining portion.

* * * * *